(12) United States Patent
Cote et al.

(10) Patent No.: US 9,221,020 B2
(45) Date of Patent: Dec. 29, 2015

(54) METHOD TO MAKE YARN-REINFORCED HOLLOW FIBER MEMBRANES AROUND A SOLUBLE CORE

(75) Inventors: Pierre Cote, Oakville (CA); Steven Kristian Pedersen, Burlington (CA)

(73) Assignee: BL TECHNOLOGIES, INC., Trevose, PA (US)

( * ) Notice: Subject to any disclaimer, the term of this patent is extended or adjusted under 35 U.S.C. 154(b) by 0 days.

(21) Appl. No.: 13/823,183

(22) PCT Filed: Sep. 6, 2011

(86) PCT No.: PCT/US2011/050479
§ 371 (c)(1),
(2), (4) Date: Mar. 14, 2013

(87) PCT Pub. No.: WO2012/036935
PCT Pub. Date: Mar. 22, 2012

(65) Prior Publication Data
US 2013/0168007 A1 Jul. 4, 2013

Related U.S. Application Data

(60) Provisional application No. 61/383,087, filed on Sep. 15, 2010.

(51) Int. Cl.
*B01D 69/00* (2006.01)
*B29C 63/04* (2006.01)
*B01D 69/08* (2006.01)

(52) U.S. Cl.
CPC ............. *B01D 69/08* (2013.01); *B01D 69/087* (2013.01); *B01D 2323/42* (2013.01); *B01D 2325/40* (2013.01); *Y10T 428/2935* (2015.01); *Y10T 428/2936* (2015.01)

(58) Field of Classification Search
CPC ......... B01D 69/00; B29C 63/04; B29D 23/00
See application file for complete search history.

(56) References Cited

U.S. PATENT DOCUMENTS 2,747,649 A * 5/1956 Reed .......................... 242/447.1
2,936,482 A   5/1960 Kilian
(Continued)

FOREIGN PATENT DOCUMENTS

CA    986422       3/1976
CA    2288316 A1   5/2000
(Continued)

OTHER PUBLICATIONS

Caplan et al., Formation of microporous Teflon PFA membranes via thermally induced phase separation, Journal of Membrane Science, 130 (1997) p. 219-237.
(Continued)

*Primary Examiner* — Jeff Aftergut
*Assistant Examiner* — Jaeyun Lee
(74) *Attorney, Agent, or Firm* — GE Global Patent Operation (57) ABSTRACT

Disclosed is the method for creating a reinforced hollow fiber membrane by applying reinforcing filaments to a core, casting a dope over the filaments and core, forming a membrane from the dope, and removing the core. The core may be a moving core, and the reinforcing yarns may comprise warp yarns and a spiral wrap yarn. The core may be soluble and removed by dissolving it. The core may be pre-wrapped with a yarn before the warp yarns are applied. The resulting reinforcing cage may be pre-shrunk before it is coated with a membrane dope. The pre-wrapped yarn may be removed, for example by dissolving it, after the reinforcing cage is coated. A precursor assembly for making a hollow fiber membrane is also provided.

16 Claims, 5 Drawing Sheets

(56) References Cited

U.S. PATENT DOCUMENTS

| | | | |
|---|---|---|---|
| 3,494,121 A | 2/1970 | Bohrer | |
| 3,547,721 A | 12/1970 | Dietzch | |
| 3,567,666 A | 3/1971 | Berger | |
| 3,615,024 A | 10/1971 | Michaels | |
| 3,673,028 A * | 6/1972 | Pearson | 156/172 |
| 3,676,193 A | 7/1972 | Cooper et al. | |
| 3,705,070 A | 12/1972 | Kim | |
| 3,745,142 A | 7/1973 | Mahlman | |
| 3,816,231 A | 6/1974 | Marshall | |
| 3,849,241 A | 11/1974 | Butin et al. | |
| 3,948,781 A | 4/1976 | Brun et al. | |
| 3,984,328 A | 10/1976 | Brun et al. | |
| 4,020,230 A | 4/1977 | Mahoney et al. | |
| 4,029,265 A * | 6/1977 | Piper | 242/437 |
| 4,061,821 A | 12/1977 | Hayano et al. | |
| 4,115,492 A | 9/1978 | Mahoney et al. | |
| 4,247,498 A | 1/1981 | Castro | |
| 4,253,936 A | 3/1981 | Leysen et al. | |
| 4,274,539 A | 6/1981 | Rabeneck et al. | |
| 4,299,083 A | 11/1981 | Igel et al. | |
| 4,335,193 A | 6/1982 | Doi et al. | |
| 4,340,480 A | 7/1982 | Pall et al. | |
| 4,384,047 A | 5/1983 | Benzinger et al. | |
| 4,399,035 A | 8/1983 | Nohmi et al. | |
| 4,405,688 A | 9/1983 | Lowery et al. | |
| 4,406,850 A | 9/1983 | Hills | |
| 4,541,981 A | 9/1985 | Lowery et al. | |
| 4,631,128 A * | 12/1986 | Coplan et al. | 210/321.87 |
| 4,664,681 A | 5/1987 | Anazawa et al. | |
| 4,666,607 A | 5/1987 | Josefiak et al. | |
| 4,702,836 A | 10/1987 | Mutoh et al. | |
| 4,707,265 A | 11/1987 | Barnes, Jr. et al. | |
| 4,741,829 A | 5/1988 | Takemura et al. | |
| 4,764,320 A | 8/1988 | Chan et al. | |
| 4,919,856 A | 4/1990 | Anazawa et al. | |
| 4,957,943 A | 9/1990 | McAllister et al. | |
| 5,011,588 A | 4/1991 | Rao et al. | |
| 5,013,339 A | 5/1991 | Mahoney et al. | |
| 5,022,990 A | 6/1991 | Doi et al. | |
| 5,032,282 A | 7/1991 | Linder et al. | |
| 5,034,129 A | 7/1991 | Ten Hove | |
| 5,066,401 A | 11/1991 | Muller et al. | |
| 5,139,529 A | 8/1992 | Seita et al. | |
| 5,143,312 A | 9/1992 | Baurmeister | |
| 5,151,191 A | 9/1992 | Sunaoka et al. | |
| 5,168,005 A | 12/1992 | Keating et al. | |
| 5,171,493 A | 12/1992 | Aptel et al. | |
| 5,209,852 A | 5/1993 | Sunaoka et al. | |
| 5,232,597 A | 8/1993 | Eguchi | |
| 5,232,642 A | 8/1993 | Kamo et al. | |
| 5,238,562 A | 8/1993 | Rogut | |
| 5,240,610 A | 8/1993 | Tani et al. | |
| 5,271,883 A | 12/1993 | Timmons et al. | |
| 5,284,583 A | 2/1994 | Rogut | |
| 5,294,338 A | 3/1994 | Kamo et al. | |
| 5,303,550 A | 4/1994 | Setzer | |
| 5,328,610 A | 7/1994 | Rogut | |
| 5,332,498 A | 7/1994 | Rogut | |
| 5,336,298 A | 8/1994 | Quinn et al. | |
| 5,374,453 A | 12/1994 | Swei et al. | |
| 5,376,273 A | 12/1994 | Pacheco et al. | |
| 5,380,477 A | 1/1995 | Kent et al. | |
| 5,385,777 A | 1/1995 | Higuchi et al. | |
| 5,392,588 A | 2/1995 | Morrison | |
| 5,435,955 A | 7/1995 | Kamei et al. | |
| 5,470,659 A | 11/1995 | Baumgart et al. | |
| 5,472,607 A | 12/1995 | Mailvaganam et al. | |
| 5,474,680 A | 12/1995 | Eguchi | |
| 5,489,406 A | 2/1996 | Beck et al. | |
| 5,497,608 A | 3/1996 | Matsumo et al. | |
| 5,547,756 A | 8/1996 | Kamo et al. | |
| 5,582,913 A | 12/1996 | Simons | |
| 5,637,385 A | 6/1997 | Mizuki et al. | |
| 5,651,888 A | 7/1997 | Shimizu et al. | |
| 5,656,167 A | 8/1997 | Martz | |
| 5,709,735 A | 1/1998 | Midkiff et al. | |
| 5,716,689 A | 2/1998 | Rogut | |
| 5,753,351 A | 5/1998 | Yoshida et al. | |
| 5,782,959 A | 7/1998 | Yang et al. | |
| 5,783,608 A | 7/1998 | Sugo et al. | |
| 5,804,128 A | 9/1998 | Ogata et al. | |
| 5,882,461 A | 3/1999 | Rogut | |
| 5,888,605 A | 3/1999 | Hachisuka et al. | |
| 5,914,039 A | 6/1999 | Mahendran et al. | |
| 5,972,501 A | 10/1999 | Ohmory et al. | |
| 6,015,495 A | 1/2000 | Koo et al. | |
| 6,024,872 A | 2/2000 | Mahendran et al. | |
| 6,048,641 A | 4/2000 | Ohmory et al. | |
| 6,077,376 A | 6/2000 | Kataro et al. | |
| 6,083,393 A | 7/2000 | Wu et al. | |
| 6,090,731 A | 7/2000 | Pike et al. | |
| 6,114,017 A | 9/2000 | Fabbricante et al. | |
| 6,127,433 A | 10/2000 | Sugo et al. | |
| 6,148,865 A | 11/2000 | Head | |
| 6,183,640 B1 | 2/2001 | Wang | |
| 6,245,239 B1 | 6/2001 | Cote et al. | |
| 6,264,044 B1 | 7/2001 | Meyering et al. | |
| 6,273,271 B1 | 8/2001 | Moya | |
| 6,280,791 B1 | 8/2001 | Meyering et al. | |
| 6,354,443 B1 | 3/2002 | Moya | |
| 6,354,444 B1 | 3/2002 | Mahendran et al. | |
| 6,454,943 B1 | 9/2002 | Koenhen | |
| 6,465,094 B1 | 10/2002 | Dugan | |
| 6,495,663 B1 | 12/2002 | Rothbard et al. | |
| 6,559,192 B2 | 5/2003 | Maccone et al. | |
| 6,562,879 B1 | 5/2003 | Hatsuda et al. | |
| 6,592,759 B2 | 7/2003 | Rabie et al. | |
| 6,635,204 B2 | 10/2003 | Tanaka et al. | |
| 6,746,627 B2 | 6/2004 | Niu et al. | |
| 6,792,744 B2 | 9/2004 | Feuerlohn et al. | |
| 6,802,971 B2 | 10/2004 | Gorsuch et al. | |
| 6,890,435 B2 | 5/2005 | Ji et al. | |
| 6,924,318 B2 | 8/2005 | Mischi et al. | |
| RE39,176 E | 7/2006 | Dutt | |
| 7,081,273 B2 | 7/2006 | Ji | |
| 7,165,682 B1 | 1/2007 | Ji | |
| 7,172,075 B1 | 2/2007 | Ji | |
| 7,185,597 B1 | 3/2007 | Phillips et al. | |
| 7,247,238 B2 | 7/2007 | Mullette et al. | |
| 7,267,872 B2 | 9/2007 | Lee et al. | |
| 7,306,105 B2 | 12/2007 | Shinada et al. | |
| 7,413,804 B2 | 8/2008 | Lee et al. | |
| 7,441,667 B2 | 10/2008 | Galvin et al. | |
| 7,563,376 B2 | 7/2009 | Oishi | |
| 7,776,214 B2 | 8/2010 | Saito et al. | |
| 7,807,221 B2 | 10/2010 | Shinada et al. | |
| 7,861,869 B2 | 1/2011 | Beckers et al. | |
| 7,909,177 B2 | 3/2011 | Lee et al. | |
| 2002/0046970 A1 | 4/2002 | Murase et al. | |
| 2002/0090690 A1 | 7/2002 | Eddleman et al. | |
| 2002/0111674 A1 | 8/2002 | Chouinard et al. | |
| 2002/0155289 A1 | 10/2002 | Cistone et al. | |
| 2003/0094409 A1 | 5/2003 | Minegishi et al. | |
| 2003/0098275 A1 | 5/2003 | Mahendran et al. | |
| 2003/0107150 A1 | 6/2003 | Hamanaka et al. | |
| 2003/0192826 A1 | 10/2003 | Wang et al. | |
| 2003/0197308 A1 | 10/2003 | Montoya | |
| 2004/0073300 A1 | 4/2004 | Chouinard et al. | |
| 2004/0078903 A1 | 4/2004 | Bruning et al. | |
| 2004/0136894 A1 | 7/2004 | Yoshizawa et al. | |
| 2005/0124249 A1 | 6/2005 | Uribarri | |
| 2005/0189292 A1 | 9/2005 | Ward et al. | |
| 2005/0205488 A1 | 9/2005 | Shinada et al. | |
| 2006/0000766 A1 | 1/2006 | Ji | |
| 2006/0175243 A1 | 8/2006 | Mahendran et al. | |
| 2007/0084794 A1 | 4/2007 | Morikawa et al. | |
| 2007/0262017 A1 | 11/2007 | Shinada et al. | |
| 2007/0293132 A1 | 12/2007 | Arnason | |
| 2008/0023125 A1 | 1/2008 | Arnold et al. | |
| 2008/0210623 A1 | 9/2008 | McMahon et al. | |
| 2008/0221668 A1 | 9/2008 | Pinchuk et al. | |
| 2008/0241451 A1 | 10/2008 | Beckers et al. | |
| 2008/0292823 A1 | 11/2008 | Lee et al. | |
| 2008/0305290 A1 | 12/2008 | Lee et al. | |

(56) References Cited

U.S. PATENT DOCUMENTS

| | | |
|---|---|---|
| 2009/0068428 A1 | 3/2009 | Shinoda et al. |
| 2009/0314708 A1 | 12/2009 | Yeom |
| 2010/0024631 A1 | 2/2010 | Lee et al. |
| 2011/0114553 A1 | 5/2011 | Teramachi et al. |
| 2012/0018371 A1 | 1/2012 | Cote |
| 2012/0097604 A1 | 4/2012 | Cote et al. |
| 2012/0156485 A1 | 6/2012 | Palinkas et al. |
| 2012/0164447 A1 | 6/2012 | Kohinata |
| 2013/0153490 A1 | 6/2013 | Pedersen et al. |
| 2013/0158007 A1 | 6/2013 | Mickle et al. |
| 2013/0168007 A1 | 7/2013 | Cote et al. |
| 2013/0233788 A1 | 9/2013 | Vizvardi et al. |

FOREIGN PATENT DOCUMENTS

| | | | |
|---|---|---|---|
| CA | 2474625 A1 | 8/2003 | |
| CA | 2478445 A1 | 9/2003 | |
| CA | 2478831 A1 | 9/2003 | |
| CA | 2630418 A1 | 6/2007 | |
| CH | 507012 A | 5/1971 | |
| CZ | 286263 B6 | 2/2000 | |
| DE | 4142417 | 6/1992 | |
| DE | 10211051 A1 | 10/2003 | |
| EP | 0241995 A1 | 10/1987 | |
| EP | 0761292 A1 | 3/1997 | |
| EP | 0819467 A2 | 1/1998 | |
| EP | 0998972 A1 | 5/2000 | |
| EP | 1193292 A2 | 4/2002 | |
| EP | 1236503 A1 | 9/2002 | |
| EP | 1424157 A1 | 6/2004 | |
| EP | 1658889 A1 | 5/2006 | |
| EP | 0998972 B1 | 4/2007 | |
| EP | 2043766 B1 | 2/2010 | |
| EP | 2301654 A1 | 3/2011 | |
| FR | 1511581 A | 2/1968 | |
| FR | 2616812 A1 | 12/1988 | |
| FR | 2336962 A1 | 7/1997 | |
| GB | 1325672 A * | 8/1973 | ............ B01D 13/04 |
| GB | 1374704 | 11/1974 | |
| GB | 2041821 A | 9/1980 | |
| HU | 0300443 A | 6/2003 | |
| HU | 008058 T2 | 2/2010 | |
| JP | 53-039982 A | 4/1974 | |
| JP | 52137026 A | 11/1977 | |
| JP | 53028084 A | 3/1978 | |
| JP | 55137209 A | 10/1980 | |
| JP | 57005914 A | 1/1982 | |
| JP | 57-028139 A | 2/1982 | |
| JP | 58-004810 A | 1/1983 | |
| JP | 58-049408 A | 3/1983 | |
| JP | 58-093734 A | 6/1983 | |
| JP | 59196706 A | 11/1984 | |
| JP | 60137402 A | 7/1985 | |
| JP | 60139815 A | 7/1985 | |
| JP | 61-146811 A | 7/1986 | |
| JP | 62001404 A | 1/1987 | |
| JP | 62019206 A | 1/1987 | |
| JP | 62045318 A | 2/1987 | |
| JP | 62079806 A | 4/1987 | |
| JP | 62-133190 A | 6/1987 | |
| JP | 64-014315 A | 1/1989 | |
| JP | 2107318 A | 4/1990 | |
| JP | 2268816 A | 11/1990 | |
| JP | 04-265132 A | 9/1992 | |
| JP | 4265133 | 9/1992 | |
| JP | 4293529 A | 10/1992 | |
| JP | 5301031 A | 11/1993 | |
| JP | 06-015152 A | 1/1994 | |
| JP | 06-246139 A | 9/1994 | |
| JP | 6246140 A | 9/1994 | |
| JP | 07-080263 A | 3/1995 | |
| JP | 07-116483 A | 5/1995 | |
| JP | 7157580 A | 6/1995 | |
| JP | 8165396 A | 6/1996 | |
| JP | 52082682 A | 7/1997 | |
| JP | 10-323546 A | 12/1998 | |
| JP | 11-319519 A | 11/1999 | |
| JP | 11348131 B2 | 12/1999 | |
| JP | 2000-093768 A | 4/2000 | |
| JP | 2000288365 A | 10/2000 | |
| JP | 2001-062258 A | 3/2001 | |
| JP | 2003320584 A | 11/2003 | |
| JP | 2008-114180 A | 5/2008 | |
| KR | 20040038473 A | 5/2004 | |
| KR | 20110089621 A | 8/2011 | |
| NL | 1010458 C2 | 4/2000 | |
| TW | 200946323 A | 11/2009 | |
| WO | WO 93/23153 A1 | 11/1993 | |
| WO | WO 99/01207 A1 | 1/1999 | |
| WO | WO 00/78437 | 12/2000 | |
| WO | WO 02/34373 | 5/2002 | |
| WO | WO 03/059496 | 7/2003 | |
| WO | WO 03/068374 A1 | 8/2003 | |
| WO | WO 03/076055 A1 | 9/2003 | |
| WO | WO 03/076056 A1 | 9/2003 | |
| WO | WO 03/097221 A1 | 11/2003 | |
| WO | WO 2004/009221 A1 | 1/2004 | |
| WO | WO 2004/089520 A1 | 10/2004 | |
| WO | WO 2005/002712 A1 | 1/2005 | |
| WO | 2005061081 | 7/2005 | |
| WO | 2005082503 A1 | 9/2005 | |
| WO | 2005113218 A1 | 12/2005 | |
| WO | 2005118116 A1 | 12/2005 | |
| WO | WO 2006053406 A1 | 5/2006 | |
| WO | WO 2006063426 A1 | 6/2006 | |
| WO | WO 2007116072 A1 | 10/2007 | |
| WO | WO 2008066340 A1 | 6/2008 | |
| WO | 2009142279 A1 | 11/2009 | |
| WO | 2010062454 A1 | 6/2010 | |
| WO | WO 2010/081228 A1 | 7/2010 | |
| WO | 2010018285 A1 | 9/2010 | |
| WO | 2010108285 A1 | 9/2010 | |
| WO | WO 2010/108285 A1 | 9/2010 | |
| WO | 20100148517 A1 | 12/2010 | |
| WO | WO 2010/148517 A1 | 12/2010 | |
| WO | 2012036935 A1 | 3/2012 | |
| WO | 2012067380 A2 | 5/2012 | |

OTHER PUBLICATIONS

Choi et al., Fabrication and characterization of multi-walled carbon nanotubes/polymer blend membranes, Journal of Membrane Science 284 (2006) p. 406-415.

Choi et al., Modification of Performances of Various Memranes Using MWNTs as a Modifier, Macromol. Symp. 2007, 249-250, p. 610-617.

PCT Search Report dated Jun. 14, 2010 issued in connection with PCT Application No. PCT/CA2010/000469 which was filed on Mar. 26, 2010.

Ramaswamy et al., Fabication of poly (ECTFE) membranes via thermally induced phase separation, Journal of Membrane Science, 210 (2002) p. 175-180.

Lin et al., Microporous PVDF membrane formation by immersion precipitation from water/TEP/PVDF system, Desalination, 145 (2002) p. 25-29.

Lloyd, Douglas et al., Microporous membrane formation via thermally-induced phase separation. II. Liquid-liquid phase separation, Journal of Membrane Science, 64 (1991) p. 1-11.

Lloyd, Douglas R., Microporous membrane formation via thermally induced phase separation. I. Solid-liquid phase separation, Journal of Membrane Science, 52 (1990) p. 239-261.

Jie Liu, Pingli Li et al. Preparation of PET threads reinforced PVDF hollow fiber membrane, Desalination, vol. 249, Issue 2, Dec. 15, 2009, pp. 453-457.

Search Report and Written Opinion from PCT/US2011/063332 dated Jul. 31, 2012.

Search Report and Written Opinion from PCT/US2011/050479 dated Nov. 25, 2011.

PCT Search Report dated Jun. 21, 2013 from PCT Application No. PCT/US2013/026979.

(56) References Cited

OTHER PUBLICATIONS

PCT Search Report and Written Opinion dated Mar. 28, 2013 from PCT Application No. PCT/US2012/065648.
PCT Search Report dated Oct. 16, 2013 from PCT Application No. PCT/US2013/053891.
PCT Search Report and Written Opinion dated May 13, 2013 from PCT Application No. PCT/US2013/025110.
Inoue Shoten KK, English language abstract of JP2003320584, published Nov. 11, 2003.
Sung Cheol, English language abstract of KR20110089621, published Aug. 9, 2011.
Guo-Chang, English language abstract of TW200946323, published Nov. 16, 2009.
Schunk Ultraschalltechnik GMGH, English language abstract of CZ286263, published Feb. 16, 2000.
Murata Manufacturing Co, English language abstract of JP11348131, published Dec. 21, 1999.
Tsujino, Jiromaru et al., Welding of Flat Copper Braid Wire Specimens Using Ultrasonic Complex Vibration—Direct Machining Of Terminal Parts On Flat Braided Wires, Ultrasonics Symposium, IUS 2008. IEEE, Nov. 2-5, 2008.
Elke, English language abstract of EP1424157, published Jun. 2, 2004.
English language abstact of JP 11-319519 to Nitto Denko Corp, published Nov. 24, 1999.
English language abstract of JP 04-265132 to UBE IND LTD, published Sep. 21, 1992.
English language abstract of JP 04265133 to UBE IND LTD, published Sep. 21, 1992.
English language abstract of JP 04293529 to UBE IND LTD, published Oct. 19, 1992.
English language abstract of JP 06-015152 to TOKUYAMA SODA CO LTD, published Jan. 25, 1994.
English language abstract of JP 06-246139 to DAINIPPON INK & CHEM INC, published Sep. 6, 1994.
English language abstract of JP 06246140 to DAINIPPON INK & CHEM INC, published Sep. 6, 1994.
English language abstract of JP 07-080263 to MITSUBISHI RAYON CO LTD, published Mar. 28, 1995.
English language abstract of JP 07-116483 to DAINIPPON INK & CHEM INC, published May 9, 1995.
English language abstract of JP 07157580 to KAWAMURA INST OF CHEM RES DAINIPPON INK & CHEM INC, published Jun. 20, 1995.
English language abstract of JP 08165396 to KURABE IND CO LTD, published Jun. 25, 1996.
English language abstract of JP 10-323546 to NITTO DENKO CORP, published Dec. 8, 1998.
English language abstract of JP 64-014315 to MITSUBISHI RAYON CO LTD, published Jan. 18, 1989.
English language abstract of JP 2000-093768 to NOK CORP, published Apr. 4, 2000.
English language abstract of JP 2000288365 to TORARY IND INC, published Oct. 17, 2000.
English language abstract of JP 2001-062258, to Mitsubishi Rayon Co. Ltd, published Mar. 13, 2001.
English language abstract of JP 2008114180 to Mitsubishi Rayon Co Ltd, published May 22, 2008.
English language abstract of JP 2107318 to Daicel Chem, published Apr. 19, 1990.
English language abstract of JP 2268816 to Mitsubishi Rayon Co, published Nov. 2, 1990.
English language abstract of JP 52082682 to Asahi Chemical Ind, published Jul. 11, 1997.
English language abstract of JP 52137026 to TOYOBO CO LTD, published Nov. 16, 1977.
English language abstract of JP 5301031 to Daicel Chem, published Nov. 16, 1993.
English language abstract of JP 53028084 to Nitto Electric Ind Co, published Mar. 15, 1978.
English language abstract of JP 53-039982 to Kunyu, published Sep. 3, 1974.
English language abstract of JP 55137209 to MITSUBISHI RAYON CO LTD, published Oct. 25, 1980.
English language abstract of JP 57005914 to MITSUBISHI RAYON CO LTD, published Jan. 12, 1982.
English language abstract of JP 57-028139 to ASAHI CHEM IND CO LTD, published Feb. 15, 1982.
English language abstract of JP 58-004810 to TOYOBO CO LTD, published Jan. 12, 1983.
English language abstract of JP 58-049408 to Nitto Electric Ind Co Ltd, published Mar. 23, 1983.
English language abstract of JP 58-093734 to Asahi Kasei Kogyo KK, published Jun. 3, 1983.
English language abstract of JP 59196706 to DAINIPPON INK & CHEM INC KAWAMURA INST OF CHEM RES, published Nov. 8, 1984.
English language abstract of JP 60137402 to MITSUBISHI RAYON CO LTD, published Jul. 22, 1985.
English language abstract of JP 60139815 to MITSUBISHI RAYON CO LTD, published Jul. 24, 1985.
English language abstract of JP 61-146811 to UBE IND LTD, published Jul. 4, 1986.
English language abstract of JP 62001404 to Mitsubishi Rayon Co, published Jan. 7, 1987.
English language abstract of JP 62019206 to DAINIPPON INK & CHEM INC, published Jan. 28, 1987.
English language abstract of JP 62045318 to DAINIPPON INK & CHEM INC, published Feb. 27, 1987.
English language abstract of JP 62079806 to UBE IND LTD, published Apr. 13, 1987.
English language abstract of JP 62-133190 to Toagosei Chem Ind Co Ltd, published Jun. 16, 1987.
Novelty Search Report dated Jan. 8, 2015 from Hungarian Application No. PI400398.
Solvay, English language abstract of HU0300443, published Jun. 28, 2003.
Vlaamse Intelling Voor Technologisch Onderzoek, English language translation of EP2043766 (Equivalent to HU008058).

* cited by examiner

METHOD TO MAKE YARN-REINFORCED HOLLOW FIBER MEMBRANES AROUND A SOLUBLE CORE

CROSS REFERENCE TO RELATED APPLICATIONS

This is a national stage application under 35 U.S.C. §371 (c) prior-filed, co-pending PCT patent application serial number PCT/US11/50479, filed on Sep. 6, 2011, which claims priority to U.S. Provisional Application No. 61/383,087, filed on Sep. 15, 2010, the entire contents of which are incorporated herein by reference.

BACKGROUND OF THE INVENTION

The field of embodiments of this invention is polymeric separation membranes in the form of small capillary tubes or hollow fibers for use, for example, in microfiltration (MF), ultrafiltration (UF), nanofiltration (NF), reverse osmosis (RO), pervaporation (PV), vapor permeation (VP) or gas separation.

Configurations for textile cage structures useful for reinforcing hollow fiber membranes were disclosed in international (PCT) patent applications PCT/CA2010/000469, published as WO 2010108285 on Sep. 30, 2010, and PCT/CA2010/000993, published as WO 2010148517 on Dec. 29, 2010. These applications disclosed, among other things, tube-shaped reinforcing structures that generally comprise i) a plurality of warp filaments parallel to each other and spaced apart circumferentially, and ii) wrap filaments extending obliquely between at least two of the warp filaments. PCT/CA2010/000469 and PCT/CA2010/000993 are incorporated herein in their entirety by this reference to them.

BRIEF DESCRIPTION OF THE INVENTION

Disclosed is a process of making a reinforced hollow fiber membrane, the process comprising applying reinforcing filaments to a moving core; casting a dope over the reinforcing filaments and core; forming a membrane from the dope; and, removing the core.

In another embodiment of the invention, a precursor assembly for making a hollow fiber membrane comprising, a soluble core; and, reinforcing filaments located around the core is disclosed.

DETAILED DESCRIPTION OF THE INVENTION

Figure 2:
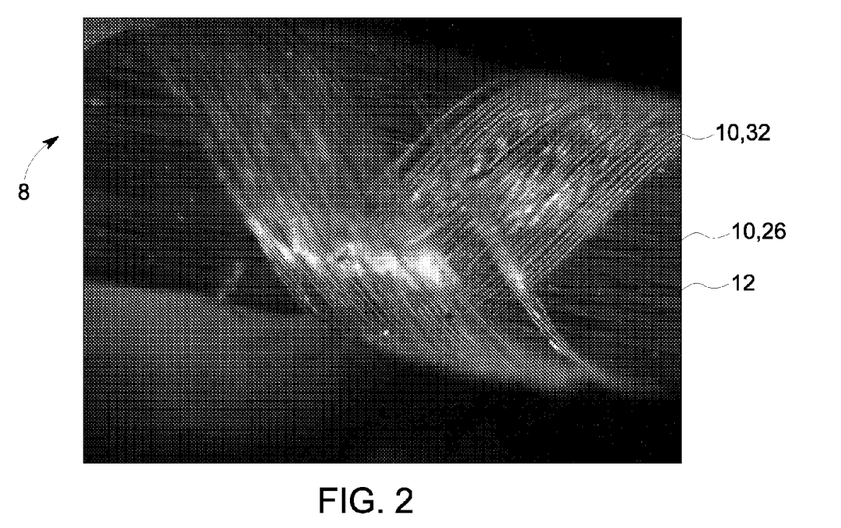
FIG. 2 is a photograph of a precursor having a reinforcing cage built around a hollow water soluble core.

Referring to FIG. 2, a precursor 8 comprises a reinforcing cage 10 built around a core 12. The core 12 in FIG. 2 is a water soluble hollow tube made by extruding a polymer. A number of water-soluble polymers are available in melt-extrusion grade. For example, several forms of vinyl alcohol, for example polyvinyl alcohol (PVOH) or ethylene vinyl alcohol (EVOH), are available from the Eastman Chemical Company, Kuraray, MonoSol or Nippon Gohsei; polyester is available from Eastman; and, nylon is available from Shakespeare.

An example of a core 12 was made from a water-soluble copolyester called EastONE™ supplied by Eastman. This tube has an inside diameter of 0.75 mm and an outside diameter of 1.0 mm. It was extruded through a donut shaped spinneret with air as a bore fluid and was air cooled. It is referred to below as SC1.

Another example of a core 12 was made from a water-soluble polyvinyl alcohol called G-Polymer™ supplied by Nippon Gohsei. This core has an inside diameter of 0.2 mm and an outside diameter of 1.0 mm. It was extruded through a donut shaped spinneret with air as a bore fluid and was air cooled. It is referred to below as SC2.

Bi-component yarns to be used to make a reinforcing structure 10 were made that are bondable by heating. Bi-component fibers for the yarn were spun from Eastman F61HC polyethylene terephthalate (PET) homopolymer (melting point 260° C.) and Dupont 3632 coPET (melting point 160° C.). The bi-component fibers were assembled into two yarns. A first yarn, which will be referred to below as Bico 1, was 110 denier with 36 filaments, each of about 3 denier, each having a core of PET and a sheath of coPET, the core being 80% of the cross-sectional area. A second yarn, which will be referred to below as Bico 2, was 200 denier with 36 filaments, each of about 5.5 denier, each having a core of PET and a sheath of coPET, the core being 50% of the cross-sectional area.

Another bi-component yarn was made that is bondable by solvent application. Bi-component fibers were spun from coPET homopolymer (melting point 240° C.) and polyvinylidene fluoride (PVDF). The bi-component fibers were assembled into a yarn, which will be described below as Bico 3, of 220 denier. This yarn was made of 36 filaments, each of about 6 denier, having a core of coPET and a sheath of PVDF, the core being about 70% of the cross-sectional area.

Figure 1:
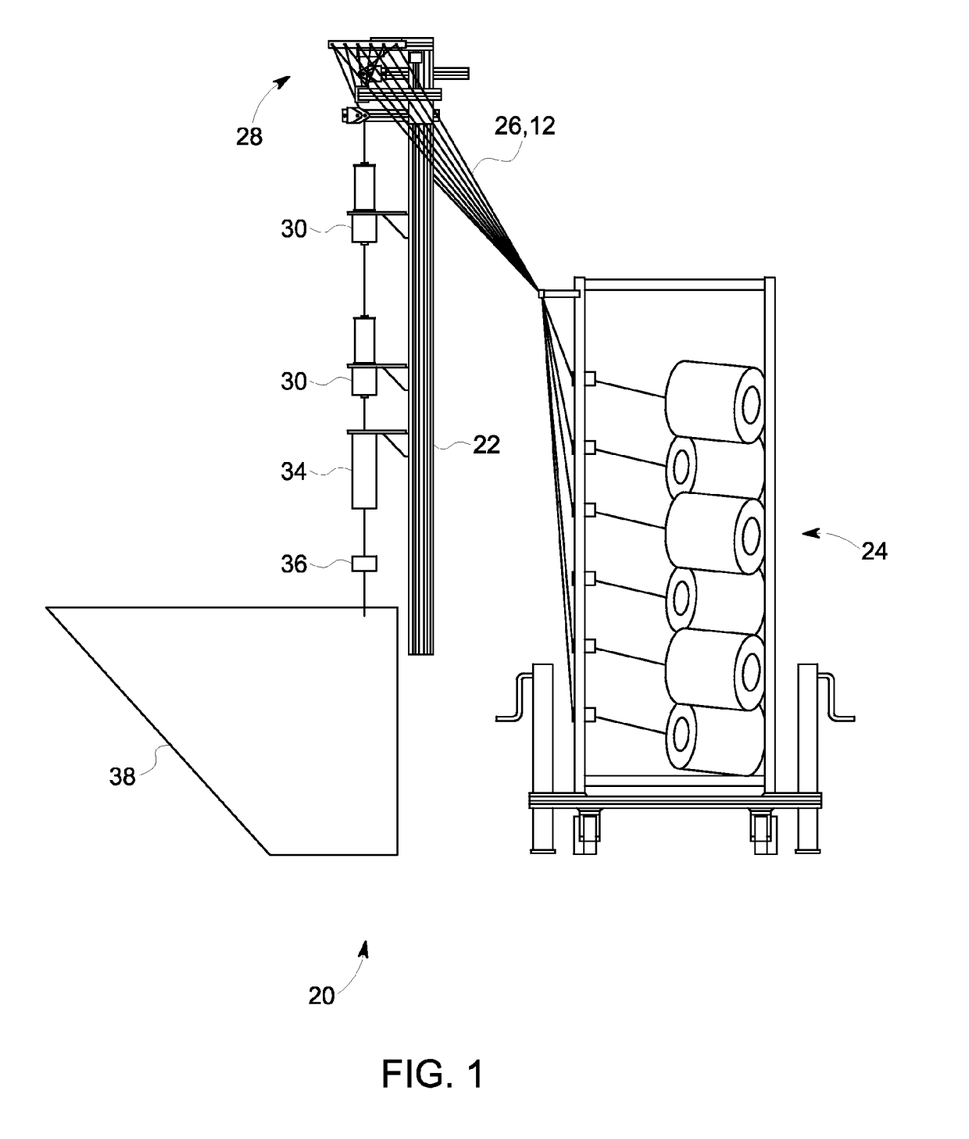
FIG. 1 is a schematic side view of a machine for making reinforced hollow fiber membranes.

FIG. 1 shows a reinforced hollow fiber forming machine 20. The machine 20 is built on a frame 22 that supports the different components and generally aligns them vertically.

Warp yarns 26 and the core 12 are supplied to the machine 20 from a creel 24. The creel 24 includes stationary bobbin holders, guides and tensioning devices, as found in conventional textile equipment. The warp yarns 26 and core 12 pass through a warp yarn distribution die 28 which has a central opening for the core 12 and a series of alignment eyelets evenly distributed around the opening for the warp yarns 26. When a movable core 12 (for example a solid core, a soluble tube or a hollow fiber membrane) is used, the core 12 is unwound from a bobbin on the creel 24, positioned to the top of the distribution die 28 through a roller and fed vertically down into the yarn distribution die 28 central opening. The warp yarns 26 are spaced around the outside of the core 12 and travel downwards with the core 12.

Depending on the type of wrap yarns 32 (see FIG. 2) being used, the next component downwards along the vertical axis of the frame 22 can be one or more wrap spinning machines, alternatively called spindles 30, or another sort of yarn wrapping device. The spindles 30 are loaded with wrap yarns 32 and apply the wrap yarns 32 to the outside of the warp yarns 26 to form the reinforcing cage 10. Due to the downward movement of the core 12 and warp yarns 26, the wrap yarns 32 form a spiral around the warp yarns 26. An example of a suitable spindle 30 is a Temco™ spindle model MSE150 made by Oerlikon Textile. Each spindle 30 has an electrical motor, a hollow core and holds a bobbin of wrap yarn 32. The spindle axis is positioned to coincide with the core 12. In the machine of FIG. 1, there are two spindles 30, one rotating clockwise and the other counter-clockwise. These spindles 30 can rotate at an adjustable speed of up to 25,000 rpm, wrapping the warp yarn 32 they carry around the core 12 and warp yarns 26 at a controlled pitch. There are small alignment guides (not visible) between each major element that serve the purpose of keeping the wrapped core in the centerline of the device and to keep the wrapped core from vibrating.

A heating zone 34 is provided below the spindles 30. The heating zone 34 includes a 4 cm diameter by 60 cm long tubular chamber with openings at the top and bottom so the axis of the heating zone 34 can be aligned with the core 12 axis. The tubular chamber also has a side connection to an air blower and a heating element. The air temperature can be controlled precisely by varying the current draw of the heating element. Depending on the time and temperature in the heating zone 34, the yarns 26, 32 will shrink. At higher temperatures, the yarns 26, 32 will be shrunk and partially melt-bonded to one another.

At the exit of the tubular chamber of the heating zone 34, before any significant cooling takes place, the core 12 and reinforcing cage 10 can go through a smoothing die 36. The smoothing die 36 is a piece of steel with a calibrated tapered hole which serves the functions of flattening any filaments that may be sticking out, and of adjusting the reinforcing cage 10 to a desired diameter. The temperature of the smoothing die 36 can be controlled.

A coating head (not shown) with a dope delivery device (not shown) are provided below the smoothing die 36. The coating head is a cylindrical chamber with calibrated openings at the top and bottom of it. The top of the coating head has an opening into which the core 12 with reinforcing cage 10 fits snugly. An opening at the bottom of the coating head is larger and designed to correspond to the outside diameter of a dope coated core 12 and reinforcing cage 10 before coagulation. The coating head has an inlet port on the side. Dope can be injected into the coating head through the inlet port from a pot pressurized with nitrogen, or using a positive displacement pump.

The dope coated core 12 and reinforcing cage 10 pass into a coagulation bath 38. The coagulation bath 38 is a stainless steel tank equipped with rollers at the bottom and at the top (not shown). A take-up winder (not shown) has an adjustable speed of between 2 and 30 m/min and a traverse guide to evenly populate a bobbin.

Polyvinylidene fluoride (PVDF) membrane dopes were prepared by dissolving PVDF into hot NMP and adding a small amount of a non-solvent. An example of a dope, referred to as Dope 3 below, is a mixture of 80 wt % NMP, 16 wt % PVDF and 4 wt % PVP k30. Another example of a dope, referred to as Dope 5 below, is a mixture of 84 wt % NMP, 14 wt % PVDF and 2 wt % PVP k30. The polymer concentration and temperature were varied to adjust dope viscosity.

Some examples of reinforcing cages 10 were formed around a solid core 12. One reinforcing cage 10 was made using three warp yarns 26 and two wrap yarns 32, all Bico 1 yarn. The yarns 26, 32 were applied around a moving core 12 of a solid nylon monofilament of about 0.9 mm in diameter. The line speed was 10 m/min. The wrap spinning devices were set at 7150 rpm, which yielded a wrapping pitch of 1.4 mm (10,000 m/min/7150 rpm). The reinforcing cage 10 was bonded by passing it through a heating zone 36 at 200° C. with a contact time of 0.3 seconds.

Figure 3:
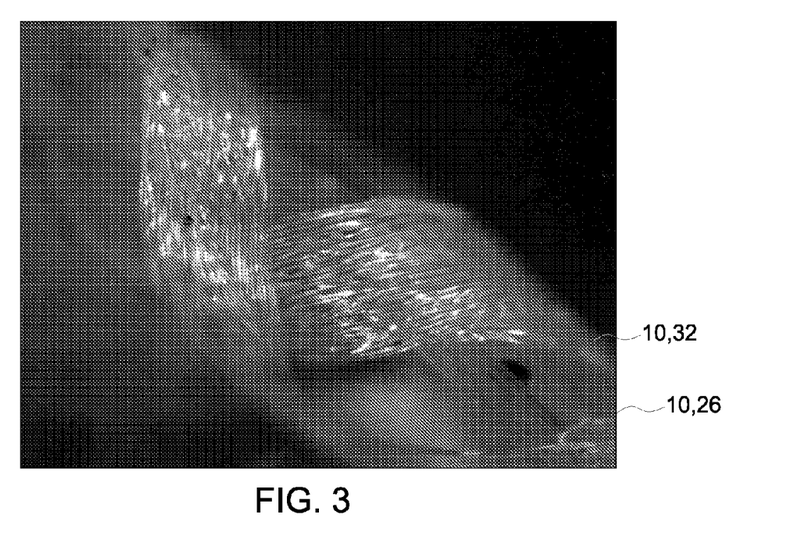
FIG. 3 is a photograph of a reinforcing cage as in FIG. 2 after the core is dissolved.

Other examples of reinforcing cages 10 were formed around a soluble core 12. One reinforcing cage 10 was made using six warp yarns 26 and two wrap yarns 32, all of Bico 3 yarn. The yarns 26, 32 were applied around a moving water-soluble core 12, SC2. The line speed was 10 m/min. The wrap spinning devices were set at 3600 rpm, which yielded a wrapping pitch of 2.8 mm (10,000 m/min/3,600 rpm). The reinforcing cage 10 was heat shrunk by passing through a heating zone at 260° C. with a contact time of 0.3 second. The photograph in FIG. 2 shows a precursor 8 comprising the reinforcing cage 10 that was formed with the core 12 still present. The photograph in FIG. 3 shows the reinforcing cage 10 after the core 12 was dissolved in hot water.

Figure 4:
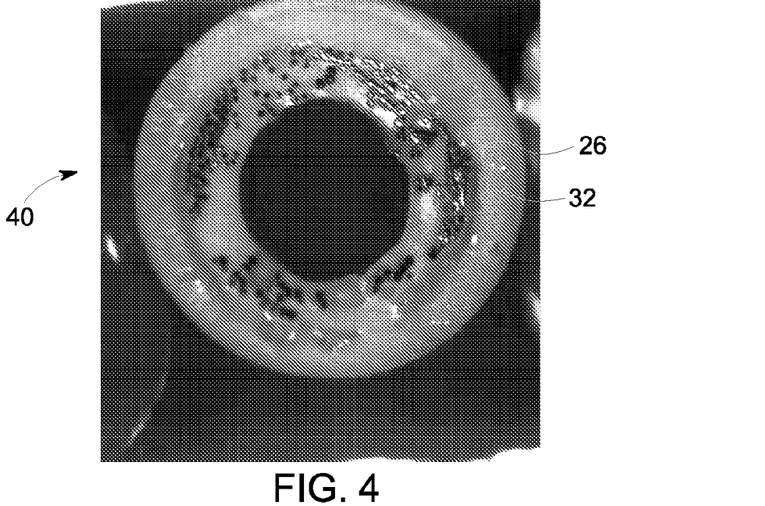
FIG. 4 is a photograph of a cross section of a reinforced hollow fiber membrane made by a batch process and using a solid core.
Figure 5:
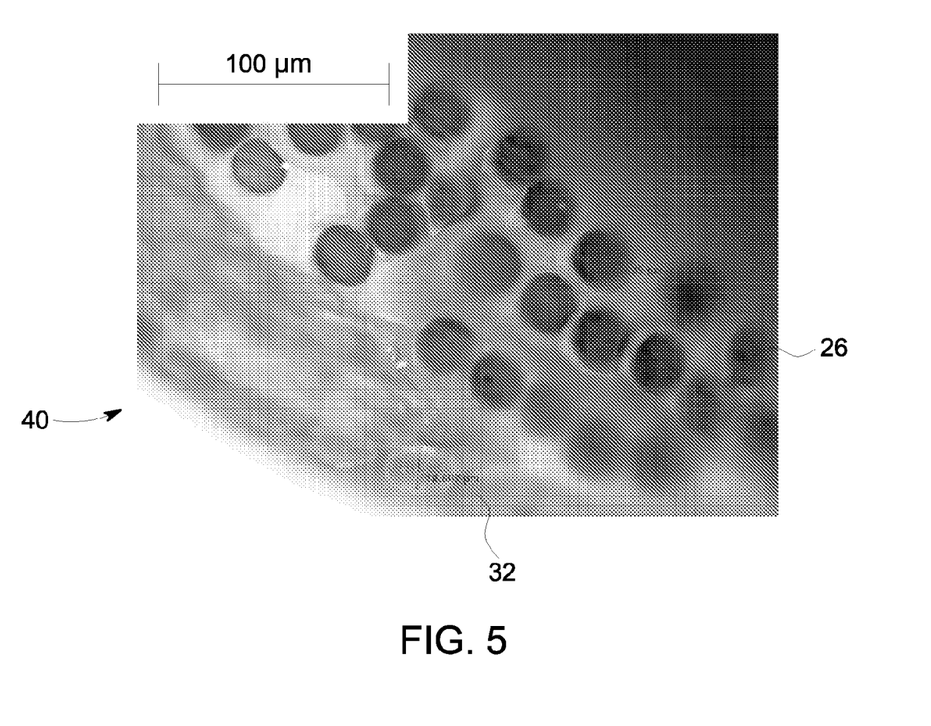
FIG. 5 is a photograph of a portion of the cross section of FIG. 4 at a higher magnification.

Referring to FIGS. 4 and 5, some examples of reinforced hollow fiber membranes 40 were made by a batch process. A short section of the reinforcing cage 10 formed around a solid moving core 12 as described above was cut and the solid core 12 was removed and replaced with a small loose fitting wire core. This structure was coated with PVDF Dope 3 and solidified by immersion in water. The photographs in FIGS. 4 and 5 show a cross-section of the resulting dried hollow fiber membrane 40 with reinforcing yarns 26, 32 embedded into the wall of the membrane 40.

Other examples of reinforced hollow fiber membranes 40 were made continuously. The reinforced hollow fiber forming machine 20 described above was used to prepare a number of samples described in the following Experiments 1 to 13. For most cases, a reinforcing cage 10 was made around a soluble hollow core (SC2) and wound on a bobbin to make a precursor. This precursor was then coated with a PVDF dope. The soluble core 12 was removed in the coagulation bath by dissolution in water to obtain a hollow fiber membrane 40. In three cases (Experiments 2, 3 and 13), the reinforcing cage 10 was built and coated with a dope, and the dope was coagulated to form a hollow fiber membrane 40 in a single continuous operation.

In some cases mentioned in the experiments below, the soluble core 10 (SC2) was pre-wrapped with a yarn which acted as a spacer to prevent the warp 26 yarn from contacting the soluble core 10. This pre-wrap yarn was not water-soluble and, in most experiments, did not get embedded in the membrane wall. After the membrane 40 was formed and the soluble core 10 was removed, the pre-wrapped yarn could easily be pulled out of the lumen of the membrane 40, leaving a porous surface on the inside of the membrane 40, without warp yarn 26 exposed. The same end result can be obtained by using a water-soluble yarn to pre-wrap the soluble core 10. A water-soluble pre-wrapped yarn, however, can be removed by dissolving it.

Samples from Experiments 10, 11 and 12 were tested for tensile strength and the maximum break load was determined as reported in Table 1 below. The Total Denier reported in Table 1 is the denier, in g/9000 m, of the sum or all warp yarns 26 and wrap yarns 32.

TABLE 1

| Exp # | Sample | Total Denier | Break-load lbf | Break-load N | Cross section (m2 × 10⁶) | Tensile break (MPa) | Average (MPa) |
|---|---|---|---|---|---|---|---|
| 10 | 1 | 1760 | 8.0 | 84.5 | 1.60 | 58.7 | 57.1 |
| 10 | 2 | 1760 | 9.5 | 80.0 | 1.60 | 55.6 | |
| 11 | 1 | 1100 | 18.5 | 82.3 | 2.12 | 38.8 | 34.6 |
| 11 | 2 | 1100 | 14.5 | 64.5 | 2.12 | 30.4 | |
| 12 | 1 | 1100 | 8.0 | 35.5 | 1.20 | 29.6 | 32.4 |
| 12 | 2 | 1100 | 9.5 | 42.3 | 1.20 | 35.3 | |

The tensile break stress for unreinforced hollow fiber membranes is 2.5 to 3.0 MPa. The reinforced hollow fiber membranes 40 made as described in this specification are 10 to 20 times stronger than conventional hollow fiber membranes. Their increased strength is essentially due to the reinforcing yarns 26, 32. Further details of experiments are described below.

In Experiment 1, an SC2 core was surrounded with 6 Bico 1 warp yarns and 2 Bico 3 wrap yarns at a pitch of 1.4 mm. The reinforcing cage was taken up on a spool and later coated with Dope 3 at 25 degrees C. moving at a speed of 2.5 m/min though a 1.6 mm coating die. The resulting membrane had an outside diameter (OD) of 1.18 mm and an inside diameter (ID) of 1.00 mm. The wall thickness was 0.04 to 0.14 mm. The membrane looked very good, but the warp fibers were clumped together on one side. The machine was adjusted before experiment 2 to improve the warp yarn distribution and it was decided to coat directly after making the reinforcing cage in a continuous operation.

In Experiment 2, an SC2 core was surrounded with 6 PET warp yarns of 140 denier each and 2 PET wrap yarns of 70 denier each at a pitch of 1.4 mm. The reinforcing cage was shrunk at 160 degrees C. The reinforcing cage was made and coated in a continuous operation. The reinforcing cage was coated with Dope 3 at 25 degrees C. moving at a speed of 2.5 m/min though a 1.6 mm coating die. The resulting membrane had an OD of 1.33 mm and an ID of 1.00 mm. The wall thickness was 0.03 to 0.30 mm. The coating looked good, but the warp fibers were not all embedded in the wall. This may have been due to the hot PVA core, the tight pitch of the wrap yarns, the high viscosity of the dope, or a combination of these factors. It was decided to increase the pitch to 3.0 mm and coat with a dope of lower viscosity in future experiments.

In Experiment 3, an SC2 core was surrounded with 6 Bico 1 warp yarns of 110 denier each and 2 Bico 3 wrap yarns of 220 denier each at a pitch of 1.0 mm. The reinforcing cage was shrunk at 160 degrees C. The reinforcing cage was made and coated in a continuous operation. The reinforcing cage was coated with Dope 5 at 25 degrees C. moving at a speed of 2.5 m/min though a 1.6 mm coating die. The resulting membrane had an OD of 1.4 mm and an ID of 1.00 mm. The wall thickness was 0.13 to 0.22 mm. The membrane wall thickness was even but thin and the membrane cracked when bent sharply. The wrap yarns could be unraveled but the dope seemed to attach to the PET/coPET warp yarns. It was decided to change the warp yarns to PVDF in future experiments.

In Experiment 4, an SC2 core was surrounded with 6 Bico 3 warp yarns of 220 denier each and 2 Bico 3 wrap yarns of 220 denier each at a pitch of 1.0 mm at a speed of 5 m/min. The reinforcing cage was shrunk at 160 degrees C. and taken up on a spool. The reinforcing cage was coated later when cold with Dope 5 at 25 degrees C. moving at a speed of 2.5 m/min though a 1.6 mm coating die. The resulting membrane had an OD of 1.4 mm and an ID of 1.00 mm. The wall thickness was 0.13 to 0.22 mm. The coating gave good looking membranes, but when pulled the membrane skin could break and the wrap yarns could spiral out. There seemed to be little or no adhesion of the dope to the warp yarns and some bunching was evident. The 1 mm pitch was apparently too tight to allow the dope to penetrate inside the wrap and engulf the warp fibers. It was decided to increase the wrap pitch to 3 mm to allow better dope penetration in future runs.

In Experiment 5 an SC2 core was surrounded with 6 Bico 3 warp yarns of 220 denier each and 2 Bico 3 wrap yarns of 220 denier each at a pitch of 3.0 mm at a speed of 5 m/min. The reinforcing cage was shrunk at 160 degrees C. The reinforcing cage was coated later with Dope 5 at 25 degrees C. moving at a speed of 2.5 m/min though a 1.6 mm coating die. The resulting membrane had an OD of 1.4 mm and an ID of 0.95 mm. The wall thickness was 0.10 to 0.35 mm. The membrane coating had good penetration. The warp fiber was wetted with dope but not completely embedded in the membrane wall. The membrane had very good longitudinal strength and did not break but could be kinked in areas between wrap yarn coverage. It was decided to repeat Experiment 5 with the 3 mm wrap yarn pitch but coat with heated Dope 5 to reduce the viscosity of the dope.

In Experiment 6 an SC2 core was surrounded with 6 Bico 3 warp yarns of 220 denier each and 2 Bico 3 wrap yarns of 220 denier each at a pitch of 3.0 mm and at a speed of 5 m/min. The reinforcing cage was shrunk at 160 degrees C. The reinforcing cage was coated later with Dope 5 at 40 degrees C. moving at a speed of 2.5 m/min though a 1.6 mm coating die. The resulting membrane had an outside diameter OD of 1.4 mm and an ID of 0.95 mm. The wall thickness was 0.10 to 0.35 mm. The resulting membranes had good longitudinal strength but could kink, or have holes in parts of the membrane areas where there was a gap between the warp and wrap yarns. The distribution of warp yarns was not good with bunching still evident. It was decided to increase the number of warp yarns from 6 to 12 to have a more uniform and complete coverage of the membrane circumference. To enhance the diffusion of the dope to the core it was decided to pre-wrap the core.

In Experiment 7, an SC2 core was pre-wrapped with 1 Bico 1 yarn at a pitch of 3.5 mm. The pre-wrapped core was surrounded with 12 Bico 3 warp yarns of 220 denier each and 2 Bico 3 wrap yarns of 220 denier each at a pitch of 3.5 mm and at a speed of 5 m/min. The reinforcing cage was shrunk at 160 degrees C. The reinforcing cage was coated later with Dope 5 at 100 degrees C. moving at a speed of 1.97 m/min though a 1.65 mm coating die. The resulting membrane had an OD of 1.4 mm, and an ID of 0.95 mm. The wall thickness was 0.15 to 0.30 mm. The membrane has good longitudinal strength but tends to kink. It was proposed that the kinking may be due to the small OD/ID ratio. The dope did not penetration to the pre-wrap yarn, which was easily pulled out. It was decided to make a membrane with a thicker wall by increasing the coating die bottom opening diameter.

In Experiment 8, an SC2 core was pre-wrapped with 1 Bico 1 yarn of 110 denier at a pitch of 3.5 mm. The pre-wrapped core was surrounded with 12 Bico 3 warp yarns of 220 denier each and 2 Bico 3 wrap yarns of 220 denier each at a pitch of 3.5 mm and at a speed of 5 m/min. The reinforcing cage was shrunk at 160 degrees C. The reinforcing cage was coated later with Dope 4 (16% PVDF/4% PVP/80% NMP) at 100 degrees C. and a pressure of 50 psi, with the reinforcing cage moving at a speed of 1.8 m/min though a 1.80 mm coating die. The resulting membrane had an OD of 1.95 mm and an ID of 0.95 mm. The membrane had an asymmetrical coating, with the wall thickness being materially larger on one side of the membrane, due to the high pressure of the dope used in coating and possibly due to misalignment. The membrane had good longitudinal strength with no folding or kinking. In an attempt to produce a more nearly symmetrical coating, it was decided use low viscosity Dope 5.

In Experiment 9, an SC2 core without a pre-wrap was surrounded with 12 Bico 3 warp yarns of 220 denier each and 2 Bico 3 wrap yarns of 220 denier each at a pitch of 3.5 mm. The reinforcing cage was shrunk at 160 degrees C. The reinforcing cage was coated later with Dope 5 at 25 degrees C., with the reinforcing cage moving at speeds of 1.97 and 1.4 m/min though a 1.80 mm coating die. The resulting membrane had an OD of 1.7 mm and an ID of 0.85 mm. The membrane was unsymmetrical which was believed to be due to movement of the reinforcing cage in the die hole. The reinforcing cage may get pushed to one side, or there machine may be misaligned. There was incomplete dope penetration around the warp fibers. The longitudinal strength of the membrane was good and there were no kinks. It remained difficult to produce a large diameter symmetrical fiber. It was decided to repeat Experiment 9 but using high temperature dope.

In Experiment 10, an SC2 core was pre-wrapped with 1 Bico 1 yarn of 110 denier at a pitch of 3.5 mm. The pre-wrapped core was surrounded with 12 Bico 3 warp yarns of 220 denier each and 2 Bico 3 wrap yarns of 220 denier each at a pitch of 3.5 mm and at a speed of 5 m/min. The reinforcing cage was shrunk at 160 degrees C. The reinforcing cage was coated later with Dope 3 at 60 degrees C., with the reinforcing cage moving at a speed of 2.5 m/min though a 1.85 mm coating die. The resulting membrane had an OD of 1.6 mm and an ID of 0.85 mm. The membrane was generally symmetrical with good longitudinal strength and no kinking. The warp yarns were completely embedded in the dope. It was decided to repeat Experiment 10, but with the number of warp yarns reduced to 6.

In Experiment 11, an SC2 core was pre-wrapped with 1 Bico 1 yarn of 110 denier at a pitch of 3.5 mm. The pre-wrapped core was surrounded with 6 Bico 1 warp yarns of 110 denier each and 2 Bico 3 wrap yarns of 220 denier each at a pitch of 3.5 mm at a speed of 5 m/min. The reinforcing cage was shrunk at 160 degrees C. The reinforcing cage was coated later with Dope 3 at 100 degrees C. and a pressure of 6 psi, with the reinforcing cage moving at a speed of 2.5 m/min though a 1.85 mm coating die. The resulting membrane had an OD of 1.85 mm and an ID of 0.85 mm. It was concluded that the large coating die opening tends to result in asymmetric membranes (uneven wall thickness), and that the problem is worse with high dope pressure. However, there was good dope penetration around the warp yarns. Membranes made with higher temperature dopes (100-160 degrees C.) result in membranes with internal diameters smaller than the outside diameter of the core, indicating that the dope penetrates the warp yarns and swells the core. It would be preferable to change either the polymer used for the core or the components of the dope to reduce or eliminate any chemical reaction between the dope and the core. It was decided to conduct the next experiment with a smaller coating die opening.

Figure 6:
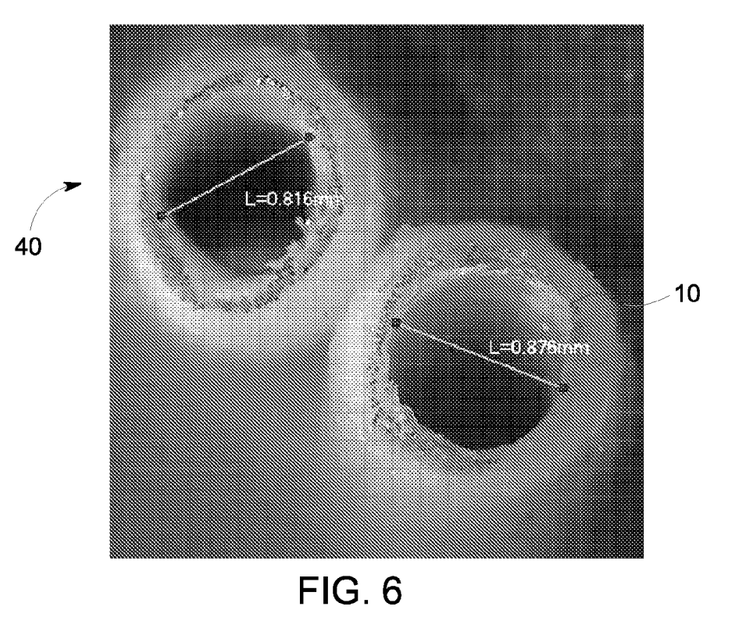
FIG. 6 is a photograph showing cross sections of reinforced hollow fiber membranes made according to conditions described as Experiment 12 below.

In Experiment 12, an SC2 core was pre-wrapped with 1 Bico 1 yarn of 110 denier at a pitch of 3.5 mm. The pre-wrapped core was surrounded with 6 Bico 1 warp yarns of 110 denier each and 2 Bico 3 wrap yarns of 220 denier each at a pitch of 3.5 mm and at a speed of 5 m/min. The reinforcing cage was shrunk at 160 degrees C. The reinforcing cage was coated later with Dope 3 at 60 degrees C. and pressures of 2.5 and 6 psi, with the reinforcing cage moving at a speed of 2.5 m/min though a 1.65 mm coating die. The resulting membrane had an OD of 1.5 mm and an ID of 0.85 mm. The resulting membrane 40, shown in FIG. 6, was the best membrane produced in Experiments 1 through 12. The membrane was generally symmetrical with nearly uniform wall thickness. The membrane was strong and kink resistant. Using a high temperature, lower viscosity dope at a lower coating pressure appears to yield a more symmetrical membrane that is still completely penetrated by the dope. The pre-wrap was completely entrapped.

Figure 7:
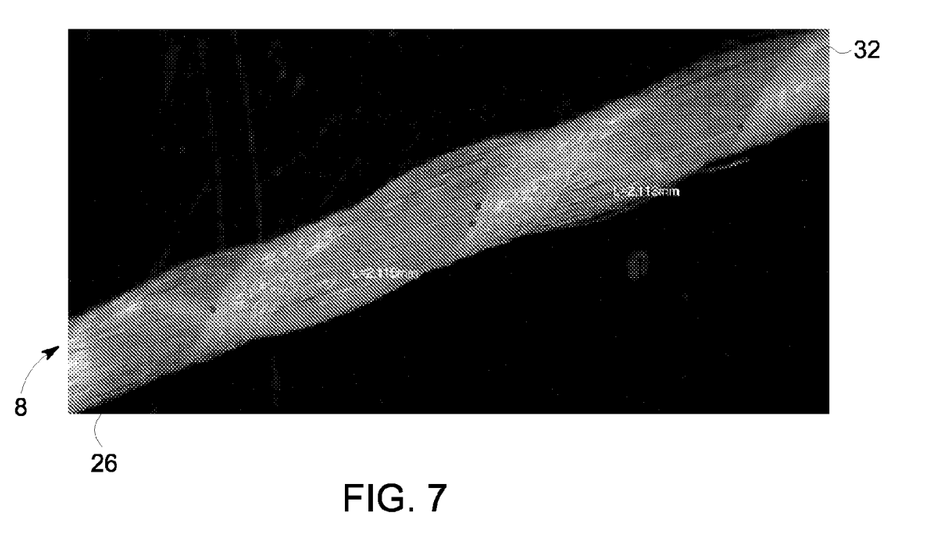
FIG. 7 is a photograph of a precursor made according to conditions described as Experiment 13 below.
Figure 8:
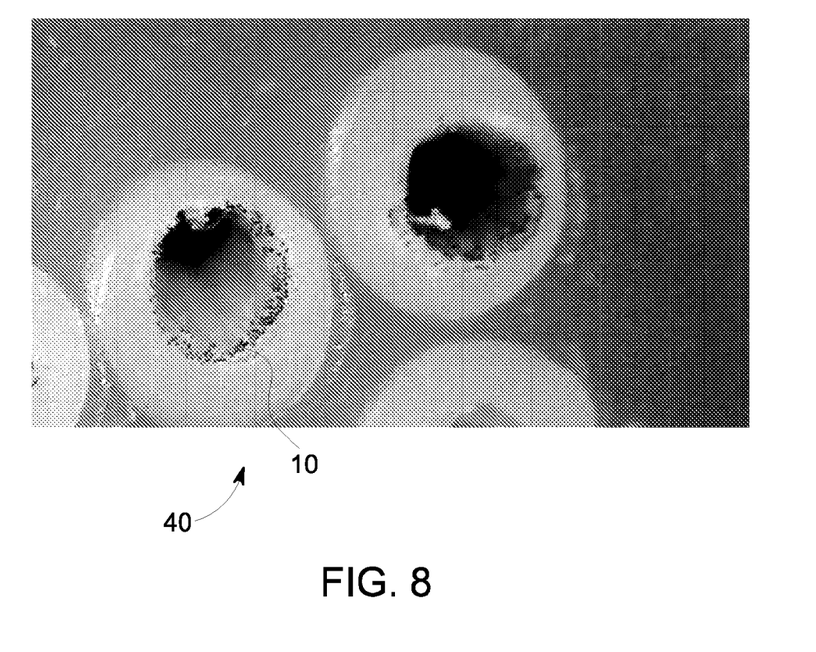
FIG. 8 is a photograph showing cross sections of reinforced hollow fiber membranes made according to conditions described as Experiment 13 below.

In Experiment 13, a core of G-polymer™ PVA had a 0.56 mm OD and a 0.4 mm ID. This core was pre-wrapped with a water soluble PVA based twisted thread having an English thread count of 80. The pre-wrap pitch was 2.4 mm. The pre-wrapped core was surrounded with 4 warp yarns of 100 denier each made of 36 filaments (about 3 denier each) of a PVDF/CoPET bicomponent filament. The warp yarns were wrapped with 1 yarn as described for the warp yarn, wrapped in the opposite direction of the pre-wrap, at a pitch of 2.1 mm. The reinforcing cage was shrunk at 140 degrees C. The reinforcing cage was coated in a continuous operation with a PVDF dope at 60 degrees C. at a delivery rate of 15 cc/minute, with the reinforcing cage moving at a speed of 16 m/minute though a 1.85 mm coating die. The reinforcing cage 10 is shown in FIG. 7 and the resulting membrane is shown in FIG. 8. The resulting membrane had an outside diameter (OD) of 1.1 mm, and inside diameter (ID) of 0.55 mm. This Experiment produced a smaller diameter membrane than Experiments 1 to 12. The core was dissolved after the membrane was made.

In an embodiment, a reinforcing structure for a hollow fiber membrane is made with a plurality of reinforcing filaments. The reinforcing filaments may include longitudinally extending filaments, which may be called warp filaments, as well as one or more filaments that extend obliquely between warp filaments, which may be called "wrap" filaments. The wrap filaments may be provided in a continuous spiral around the warp filaments. Generally continuous wrap filaments may be applied using one or more rotating creels that rotate around a moving core or by wrap spinning machines.

The reinforcing filaments in the structure described above are not woven or braided together, but they may be bonded together at one or more points of contact between them. The bonding may be by way of heat, softening with a solvent or UV-activation. The bonding may occur before a membrane is formed around the reinforcing structure. Alternatively, a reinforcing structure may be bonded while a membrane is formed around the reinforcing structure by way of a solvent in the membrane dope softening the reinforcing filaments or a component, such as an outer layer, of the reinforcing filaments.

In an embodiment, a reinforcing filament may be a monofilament or a multi-filament such as a yarn. A reinforcing filament may be made of a polymer and have an outer layer or other part made of another polymer that better responds to a bonding method. For example, a reinforcing filament may have an outer layer of a polymer that is soluble in a solvent used in a membrane forming dope. A reinforcing filament may comprise a polymer is also present in the dope to make the membrane.

In an embodiment, a reinforcing structure, whether of the type described above or another type, may be formed over a moving core, which moves while the yarns or other filaments are placed around it. Optionally, the moving care may continue to move through a membrane coating head or spinneret. A moving core may comprise a previously formed soluble core. The core can be a solid or capillary tube that can be later dissolved in a solvent, which may be water, used to coagulate the membrane.

In an embodiment, the bonding method, or another process step, may induce a controlled amount of shrinkage to tighten the wrap yarn around the core and maintain the warp yarn in place around the circumference of the core.

In an embodiment, the reinforcing structure in the coating head passes through a hole thus creating an annular passage around the core and placing the reinforcing structure within the membrane wall. Optionally, the filaments of the reinforcing structure may also be smoothed in a die before they pass through a coating head.

In an embodiment, the supporting structure may be relatively open with the membrane dope fully impregnating the yarns. A separation layer may be located on the outside of the membrane.

In an embodiment, the core can be pre-wrapped, for example with a soluble yarn of the same or similar polymer as the soluble core described above. The pre-wrap serves the purpose of creating a porous layer around the core to keep the warp yarn from touching the core. This allows dope to penetrate to the core and completely impregnate the reinforcing yarns, preferably including the warp yarns.

In an embodiment, the membrane forming steps are similar to those used to make non-reinforced or coated braid hollow fibers. These steps vary according to the polymer coagulation method, such as non-solvent induced phase separation (NIPS) or thermally induced phase separation (TIPS), and the desired membrane properties. These conditions have been generally described in the prior art and typically include the steps of initial membrane formation through an air gap, coagulation, rinsing, post-treatment (for example chlorination), impregnation (for example with glycerine), bundling and drying.

In an embodiment, the overall speed of a method of making a membrane, or spinning velocity, is controlled by the speed of the first device to take up the hollow fiber membrane after the coating head. If the membrane will be coated as the reinforcing structure is made in a continuous process, then upstream devices that apply the wrap filaments are controlled to operate at a speed appropriate for the spinning velocity and may be coupled either mechanically or electronically to the first take up device or its controller. The finished hollow fiber membrane is typically wound on a spool for transfer to a module manufacturing area. Optionally, the warp and wrap filaments may be applied to a soluble core to form a precursor assembly which may be wrapped on a spool. The precursor assembly may later be drawn off of the spool and send to a coating head to complete the membrane.

This written description uses examples to disclose embodiments of the invention, including the best mode, and also to enable any person skilled in the art to practice embodiments of the invention, including making and using any devices or systems and performing any incorporated methods. The patentable scope of embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process of making a reinforced hollow fiber membrane, the process comprising:
   applying reinforcing filaments to a core while moving the core longitudinally;
   casting a dope over the reinforcing filaments and the core;
   forming a membrane from the dope;
   removing the core; and
   shrinking the reinforcing filaments before casting the dope over the reinforcing filaments.

2. A process of making a reinforced hollow fiber membrane, the process comprising:
   applying reinforcing filaments to a core while moving the core longitudinally;
   casting a dope over the reinforcing filaments and the core;
   forming a membrane from the dope;
   removing the core;
   wrapping the core with pre-wrap filaments before applying the reinforcing filaments to the moving core; and
   removing the pre-wrap filaments after casting the dope over the reinforcing filaments.

3. The process of claim 2, further comprising removing the pre-wrap filaments by dissolving them.

4. A process of making a reinforced hollow fiber membrane, the process comprising:
   applying reinforcing filaments to a moving core;
   casting a dope over the reinforcing filaments and the core;
   forming a membrane from the dope; and
   removing the core,
   wherein the reinforcing filaments comprise warp filaments and wrap filaments.

5. The process of claim 4, wherein the core is soluble and the step of removing the core comprises dissolving the core.

6. The process of claim 5, wherein the core is soluble in water.

7. The process of claim 4, wherein the moving core is hollow.

8. The process of claim 4, wherein the warp filaments comprise warp yarns and the wrap filaments comprise one or more wrap yarns provided in a continuous spiral around the warp yarns.

9. The process of claim 4 wherein the core moves through a membrane coating head while reinforcing filaments are applied to the core.

10. A process of making a reinforced hollow fiber membrane, the process comprising:
    applying reinforcing filaments to a core while moving the core longitudinally;
    casting a dope over the reinforcing filaments and the core;
    forming a membrane from the dope; and
    removing the core,
    wherein the reinforcing filaments comprise a polymer that is soluble in the membrane dope.

11. The process of claim 10, wherein the reinforcing filaments comprise filaments having an outer layer of a polymer that is soluble in a solvent used in the dope.

12. A process of making a reinforced hollow fiber membrane, the process comprising:
    applying reinforcing filaments to a core while moving the core longitudinally;
    casting a dope over the reinforcing filaments and the core;
    forming a membrane from the dope; and
    removing the core,
    subject to one or more of the following limitations: a core outside diameter of 0.5 to 1.0 mm; a membrane outside diameter to inside diameter ratio of 1.5 or more; 4 to 12 warp yarns, covering substantially the entire circumference of the core; 1 or 2 wrap yarns, at a pitch of 1.5 to 4.5 mm; shrinking the reinforcing filaments before coating at a temperature of 100 degrees C. or more; coating the dope at a temperature of 50 degrees C. or more; coating the dope at a pressure of 20 psi or less; and having a die opening diameter to core outside diameter ratio of 1.75 or less.

13. The process of claim 12, wherein the core outside diameter is between 0.5 mm and 1.0 mm and the membrane outside diameter to inside diameter ratio is 1.5 or more.

14. The process of claim 12, wherein the reinforcing filaments comprise 4 to 12 warp yarns and 1 or 2 wrap yarns at a pitch of 1.5 to 4.5 mm.

15. The process of claim 12, wherein the dope is coated at a temperature of 50 degrees C. or more and a pressure of 20 psi or less.

16. The process of claim 12, wherein the dope is coated on the reinforcing filaments while passing the core and reinforcing filaments through a coating head having a die opening diameter that is not more than 1.75 times the core outside diameter ratio.

* * * * *